United States Patent
Serizawa et al.

(10) Patent No.: US 6,625,779 B1
(45) Date of Patent: Sep. 23, 2003

(54) TRANSMISSION CHANNEL ERROR DETECTION CODE ADDITION APPARATUS AND ERROR DETECTION APPARATUS

(75) Inventors: Masahiro Serizawa, Tokyo (JP); Hironori Ito, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/510,900

(22) Filed: Feb. 23, 2000

(30) Foreign Application Priority Data

Feb. 24, 1999 (JP) .......................................... 11-047205

(51) Int. Cl.[7] .............................................. H03M 13/00
(52) U.S. Cl. ..................................................... 714/807
(58) Field of Search ................................ 714/758, 747, 714/752, 788

(56) References Cited

U.S. PATENT DOCUMENTS

| | | | | |
|---|---|---|---|---|
| 5,097,507 A | * | 3/1992 | Zinser et al. ................... | 381/31 |
| 5,666,370 A | * | 9/1997 | Ganesan et al. ............. | 714/752 |
| 5,710,781 A | * | 1/1998 | Zinser et al. ................ | 714/747 |
| 6,163,873 A | * | 12/2000 | Murano ....................... | 714/782 |
| 6,202,188 B1 | * | 3/2001 | Suzuki et al. ............... | 714/758 |

FOREIGN PATENT DOCUMENTS

| | | |
|---|---|---|
| JP | 3-201839 | 9/1991 |
| JP | 5-316053 | 11/1993 |
| JP | 8-65275 | 3/1996 |
| JP | 9-98157 | 4/1997 |
| JP | 10-22937 | 1/1998 |
| JP | 11-298448 | 10/1999 |

OTHER PUBLICATIONS

"Code Theory", the Institute of Electronics, Information and Communication Engineers, 1990, pp. 118–120.
T. Ohya, et al., Pitch Synchronous Innovation CELP (PSI–CELP)—PDC half–rate speech CODEC–, technical report of IEICE, RCS93–78, Nov. 1993, pp. 63–70.
"Volume 3, Specifications of Air–Interface for 3G Mobile System", Association of Radio Industries and Business (ARIB), Jul. 1998, p. 118 and Annex D.
Japanese Office Action issued Oct. 24, 2000 in a related application with English translation of relevant portions.

* cited by examiner

*Primary Examiner*—Albert Decady
*Assistant Examiner*—Shelly A Chase
(74) *Attorney, Agent, or Firm*—Dickstein, Shapiro, Morin & Oshinsky, LLP.

(57) ABSTRACT

A transmission channel error detection code addition apparatus includes a division section, calculation section, and transmission section. The division section divides a code bitstream obtained from input information having a coding unit time length which is an N integer multiple (N>=2) of an error detection unit time length into N bitstreams. The calculation section calculates an error detection code of each divided bitstream output from the division section. The transmission section sequentially transmits each divided bitstream output from the division section and the error detection code output from the calculation section in correspondence with each divided bitstream.

8 Claims, 3 Drawing Sheets

TRANSMISSION CHANNEL ERROR DETECTION CODE ADDITION APPARATUS AND ERROR DETECTION APPARATUS

BACKGROUND OF THE INVENTION

The present invention relates to an apparatus for coding/decoding digital information such as an audio signal and, more particularly, to an apparatus for detecting a transmission channel error using an error detection code.

Generally, to reduce transmission channel errors generated by transmission channel noise, an error detection code is used. However, if the transmission channel noise is large, transmission channel errors cannot be completely removed even when the error detection code is used. Additionally, information decoded from a received code with a transmission channel error may largely degrade. To cope with these situations, after error correction processing using an error-correcting code, a transmission channel error is detected in every unit time length (or bit length) using an error detection code of CRC (Cyclic Redundancy Check) or the like, and information resending is requested or error concealment processing is performed.

Details of an error-correcting code and error detection code are described in H. Imai, "Code Theory", the Institute of Electronics, Information and Communication Engineers, pp. 118–120, 1990 (reference 1). There is also a method of repeatedly using information obtained in the preceding unit time as error concealment processing. Details of application of this method to audio coding are described in T. Ohya et al., "Pitch Synchronous Innovation CELP (PSI-CELP)", technical report of IEICE, RCS93–78, pp. 63–70, November 1993 (reference 2).

On the other hand, there is a communication system which defines the above-described error correction processing or error detection processing not as digital information coding/decoding processing but as part of the transmission system. This communication system is described in "Volume 3, Specifications of Air-Interface for 3G Mobile System", Association of Radio Industries and Business (ARIB), p. 118 and Annex D, July 1998 (reference 3). In this communication system, a CRC error detection code is added in every the above-described unit time length. In decoding processing, an error can be detected in every unit time length.

Conventional systems associated with transmission channel error detection will be described with reference to FIGS. 6 and 7.

In a conventional error detection code addition apparatus shown in FIG. 6, a coding circuit 3 encodes digital information input to an input terminal 1, transfers the obtained coded information to a CRC circuit 7, and also outputs the information from an output terminal 9. The CRC circuit 7 calculates an error detection code from the coded information transferred from the coding circuit 3 and outputs the obtained error detection code from an output terminal 11. In the conventional error detection code addition apparatus, processing by each circuit is performed in every coding (or decoding) unit time length.

In a conventional error detection apparatus shown in FIG. 7, an error detection circuit 29 detects a transmission channel error using a detection code input to an input terminal 23 and outputs the detection result to a decoding circuit 27. The decoding circuit 27 decodes digital information from coded information input to an input terminal 21. When the detection result output from the error detection circuit 29 represents error detection, the above-described concealment processing is performed. The decoding circuit 27 outputs the decoded digital information from an output terminal 35. In the conventional error detection apparatus, processing by each circuit is performed in every coding (or decoding) unit time length.

An example of processing by the coding circuit 3 and decoding circuit 27 is an apparatus using an audio coding algorithm described in reference 2. Details of processing by the CRC circuit 7 and error detection circuit 29 are described in reference 1.

As a problem of the above-described prior arts, the transmission channel error detection result cannot be obtained in an arbitrary coding (or decoding) unit time length. This is because the communication system detects a transmission channel error in every predetermined unit time length.

SUMMARY OF THE INVENTION

It is an object of the present invention to provide a transmission channel error detection code addition apparatus and error detection apparatus which can obtain a transmission channel error detection result in an arbitrary coding unit time length in which digital information is given.

In order to achieve the above object, according to the present invention, there is provided a transmission channel error detection code addition apparatus comprising division means for dividing a code bitstream obtained from input information having a coding unit time length which is an N integer multiple (N>=2) of an error detection unit time length into N bitstreams, calculation means for calculating an error detection code of each divided bitstream output from the division means, and transmission means for sequentially transmitting each divided bitstream output from the division means and the error detection code output from the calculation means in correspondence with each divided bitstream.

DESCRIPTION OF THE PREFERRED EMBODIMENTS

The present invention will be described below in detail with reference to the accompanying drawings.

Figure 1:
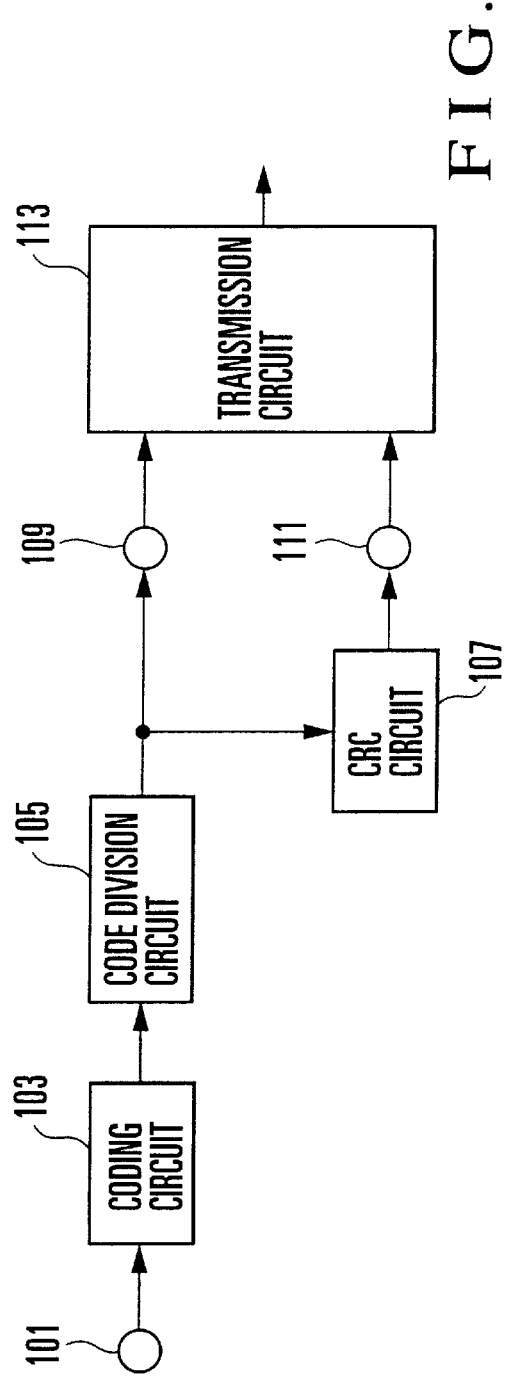
FIG. 1 is a block diagram of an error detection code addition apparatus according to the first embodiment of the present invention.

FIG. 1 shows an error detection code addition apparatus according to the first embodiment of the present invention. Referring to FIG. 1, a coding circuit 103 encodes digital information input to an input terminal 101 in every T [msec] and outputs the obtained code bitstream to a code division circuit 105. The code division circuit 105 divides the code bitstream output from the coding circuit into bitstreams of a transmission unit P [msec] and outputs them to a CRC circuit 107 and output terminal 109. The CRC circuit 107 calculates an error detection code from the bitstream corresponding to P [msec], which is output from the code division circuit 105, and outputs the error detection code to an output terminal 111.

A transmission circuit 113 multiplexes the bitstream and error detection code input through the output terminals 109 and 111 and transmits the multiplexed signal to the receiving side.

Figure 2:
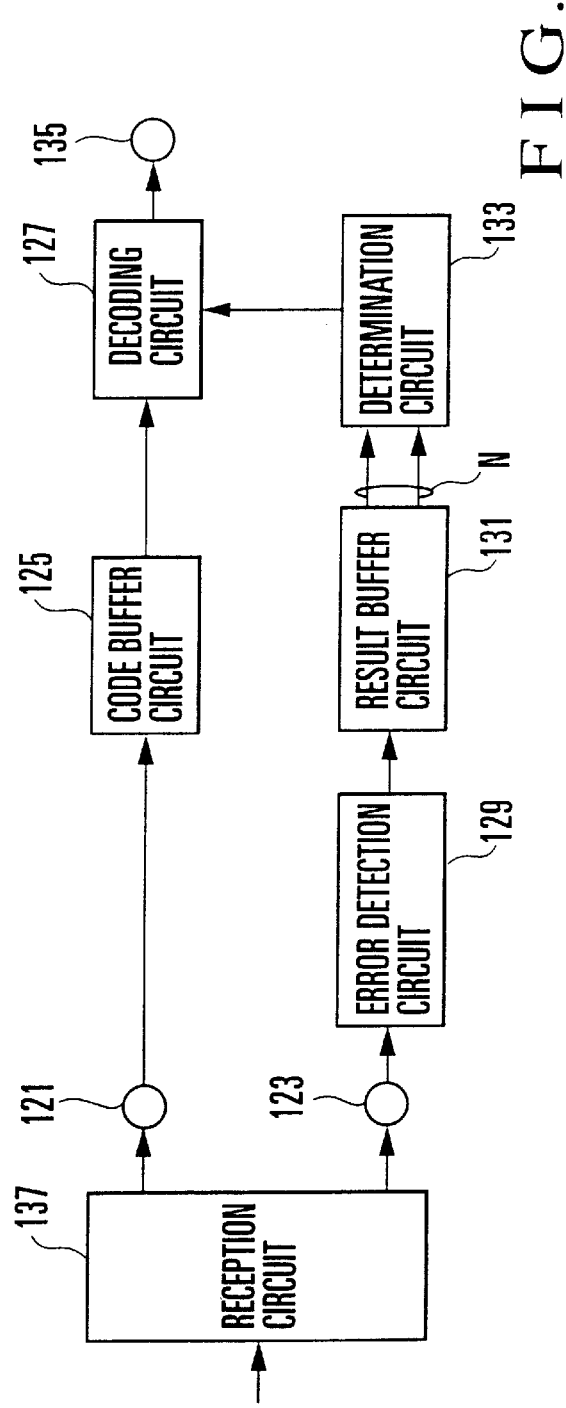
FIG. 2 is a block diagram of an error detection apparatus according to the second embodiment of the present invention.

FIG. 2 shows an error detection apparatus according to the second embodiment of the present invention.

Referring to FIG. 2, a multiplexed signal from the transmitting side, which is received by a reception circuit 137, is demultiplexed into a code bitstream and error detection code. An error detection circuit 129 detects a transmission channel error using the error detection code input to an input terminal 123 and outputs the detection result to a result buffer circuit 131. Every time N (=T/P) detection results sequentially output from the error detection circuit 129 are stored, the result buffer circuit 131 outputs N detection results to a determination circuit 133. The determination circuit 133 outputs transmission channel error detection results corresponding T [msec] to a decoding circuit 127 using the N detection results output from the result buffer circuit 131.

Every time a code buffer circuit 125 stores N code bitstreams corresponding to pieces of digital information for P [msec], which are sequentially input to an input terminal 121, the code buffer circuit 125 outputs the stored N code bitstreams to the decoding circuit 127. The decoding circuit 127 decodes digital information from the code bitstream output from the code buffer circuit 125. When the detection result output from the determination circuit 133 represents error detection, the above-described concealment processing is performed. The decoding circuit 127 outputs the decoded digital information to an output terminal 135.

Figure 3:
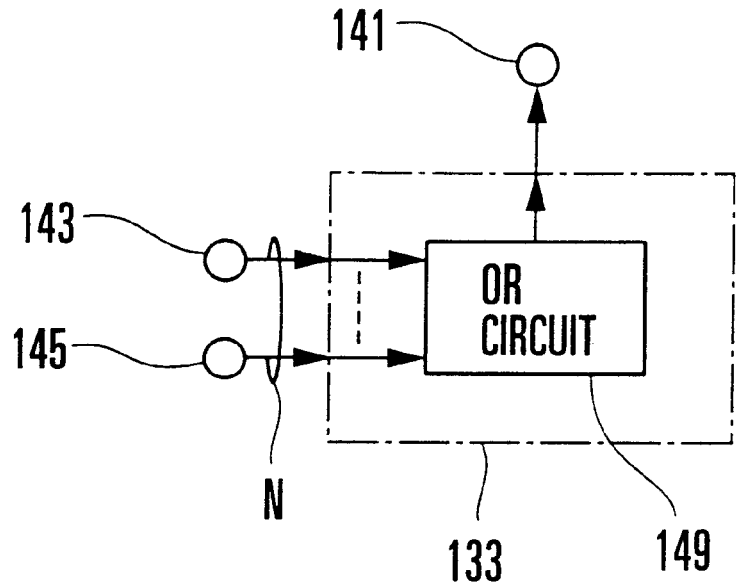
FIG. 3 is a block diagram showing an example of a determination circuit shown in FIG. 2.

FIG. 3 shows a concrete example of the determination circuit 133 shown in FIG. 2.

Referring to FIG. 3, the determination circuit 133 is constructed by an OR circuit 149 for ORing input N error detection results. The OR circuit 149 outputs an OR result representing that an error is detected from any one of the N bitstreams. The decoding circuit 127 performs concealment processing on the basis of the OR result. Referring to FIG. 3, reference numerals 134 and 145 correspond to the outputs from the result buffer circuit 131 (FIG. 2), and reference numeral 141 corresponds to the input to the decoding circuit 127 (FIG. 2).

Figure 4:
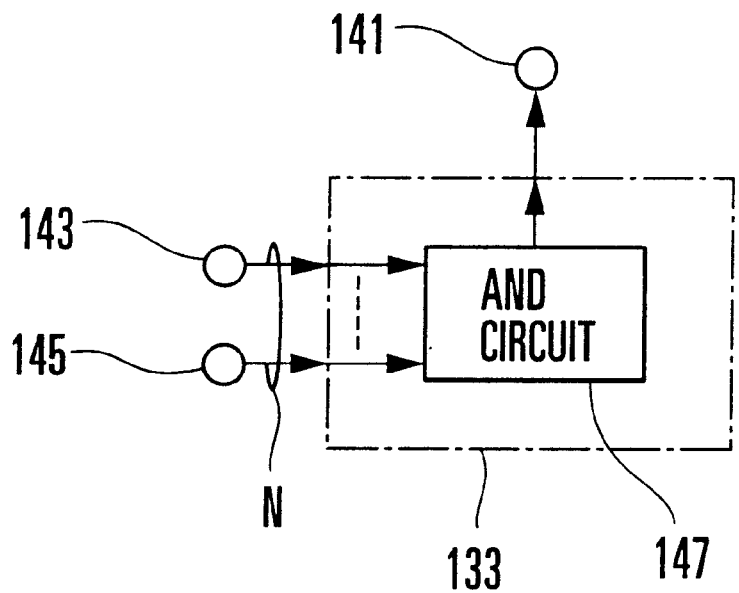
FIG. 4 is a block diagram showing another example of the determination circuit shown in FIG. 2.

FIG. 4 shows another concrete example of the determination circuit 133 shown in FIG. 2.

Referring to FIG. 4, the determination circuit 133 is constructed by an AND circuit 147 for ANDing input N error detection results. The AND circuit 147 outputs an AND result representing that errors are detected from all of the N bitstreams. The decoding circuit 127 performs concealment processing on the basis of the AND result.

Note that OR and AND mean logical calculation that outputs "1" when an error is detected, and "0" when no error is detected.

Figure 5:
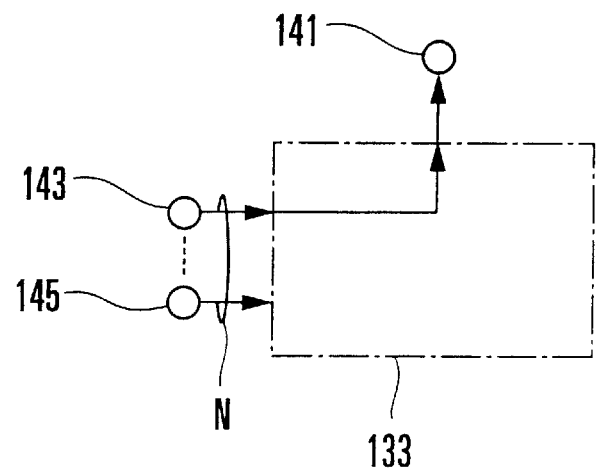
FIG. 5 is a block diagram showing still another exam the determination circuit shown in FIG. 2.
Figure 6:
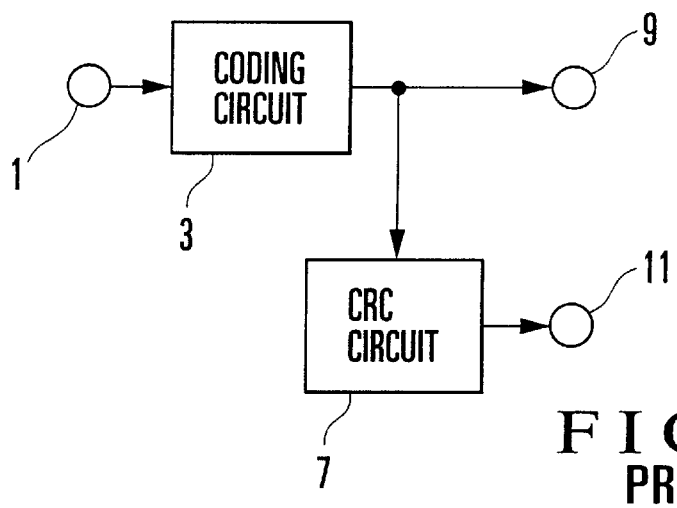
FIG. 6 is a block diagram of a conventional error detection code addition apparatus.
Figure 7:
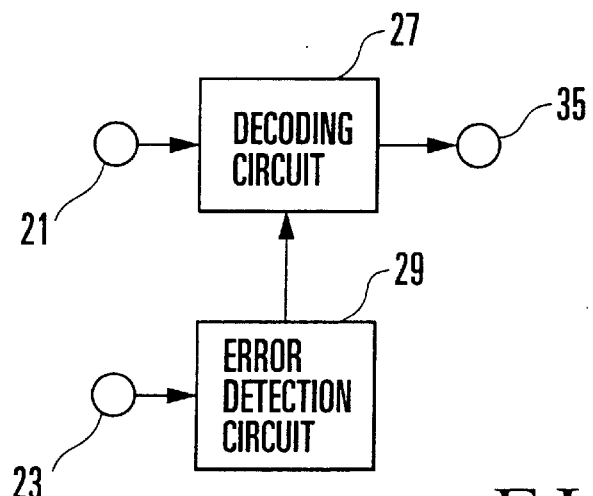
FIG. 7 is a block diagram of a conventional error detection apparatus.

FIG. 5 shows still another concrete example of the determination circuit 133 shown in FIG. 2.

Referring to FIG. 5, the determination circuit 133 outputs one of input N error detection results. More specifically, when an error is detected from a predetermined specific bitstream, the decoding circuit 127 performs concealment processing. For example, when the decoding quality of a bitstream with an error is small, as in audio coding, concealment processing is not performed. Only when an error is detected from some bitstreams whose quality largely degrades due to an error, concealment processing is performed. This technique of performing concealment processing only for a bitstream whose quality largely degrades due to an error is effective when the entire degradation is small.

In the transmission system according to the present invention, which adds an error code and detects an error, a code bitstream output from the output terminal 109 and a detection code output from the output terminal 111 of the error code addition apparatus shown in FIG. 1 are received by the input terminals 121 and 123 of the error detection apparatus shown in FIG. 2 through the path of transmission circuit 113—transmission channel (not shown)—reception circuit 137.

As has been described above, according to the present invention, when the decoding unit time length T [msec] of digital information is an integer multiple (T=P·N) of the unit time length P [msec] in which the transmission channel error detection result of the communication system is given, the transmission channel error detection result can be obtained in an arbitrary decoding unit length in which digital information is given. This is because one detection result corresponding to the period of the decoding unit time length T is obtained from a plurality of transmission channel error detection results obtained in every unit time length P predetermined by the communication system.

In addition, a transmission channel error can be detected in every bit length shorter than the decoding unit bit length corresponding to the decoding unit time length T. This is because the unit bit length P corresponding to the unit time length in which the communication system can detect a transmission channel error is shorter than the decoding unit bit length T.

What is claimed is:

1. A transmission channel error detection code addition apparatus comprising:

division means for dividing a code bitstream obtained from input information having a coding unit time length which is an N integer multiple (N>=2) of an error detection unit time length into N bitstreams;

calculation means for calculating an error detection code of each divided bitstream output from said division means; and transmission means for sequentially transmitting each divided bitstream output from said division means and the error detection code output from said calculation means in correspondence with each divided bitstream.

2. A transmission channel error detection apparatus comprising:

reception means for sequentially receiving N bitstreams obtained by dividing input information having a coding unit time length which is an N integer multiple (N>=2) of an error detection unit time length and N error detection codes corresponding to the bitstreams;

first storage means for storing the divided bitstreams output from said reception means;

error detection means for detecting an error from each divided bitstream using a corresponding error detection code output from said reception means;

error determination means for performing error determination on the basis of N error detection results by the error detection codes, which are output from said error detection means; and decoding means for decoding digital information from the divided bitstreams read out from said first storage means using a determination result output from said error determination means.

3. An apparatus according to claim 2, wherein said error determination means comprises an AND circuit for outputting an AND of the N error detection results from said error detection means as the determination result.

4. An apparatus according to claim 2, wherein said error determination means comprises an OR circuit for outputting an OR of the N error detection results from said error detection means as the determination result.

5. An apparatus according to claim 2, wherein said error determination means outputs one of the N error detection results from said error detection means as the determination result.

6. An apparatus according to claim 2, wherein said decoding means performs error concealment processing when the determination result from said error determination means represents error determination.

7. An apparatus according to claim 2, wherein said apparatus further comprises second storage means for storing the error detection results from said error detection means, and said error determination means performs a determination operation on the basis of N error detection results read out from said second storage means.

8. A transmission system in which code information added with an error detection code is transmitted from an error detection code addition apparatus, and the transmitted code information is received by an error detection apparatus and an error is detected, wherein said error detection code addition apparatus comprises:

division means for dividing a code bitstream obtained from input information having a coding unit time length which is an N integer multiple (N>=2) of an error detection unit time length into N bitstreams;

calculation means for calculating an error detection code of each divided bitstream output from said division means; and transmission means for sequentially transmitting, to said error detection apparatus, each divided bitstream output from said division means and the error detection code output from said calculation means in correspondence with each divided bitstream, and said error detection apparatus comprises:

reception means for sequentially receiving N bitstreams and N corresponding error detection codes, which are transmitted from said error detection code addition apparatus;

storage means for storing the divided bitstreams output from said reception means;

error detection means for detecting an error from each divided bitstream using a corresponding error detection code output from said reception means;

error determination means for performing error determination on the basis of N error detection results by the error detection codes, which are output from said error detection means; and decoding means for decoding digital information from the divided bitstreams read out from said storage means using a determination result output from said error determination means.

* * * * *